United States Patent
Kim et al.

(10) Patent No.: US 11,509,409 B2
(45) Date of Patent: Nov. 22, 2022

(54) COMMUNICATION DEVICE, COMMUNICATION METHOD, COMPUTER PROGRAM PRODUCT, AND COMMUNICATION SYSTEM

(71) Applicant: KABUSHIKI KAISHA TOSHIBA, Tokyo (JP)

(72) Inventors: Suh Wuk Kim, Ota Tokyo (JP); Hiroki Kudo, Kawasaki Kanagawa (JP); Yasuyuki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/180,715

(22) Filed: Feb. 19, 2021

(65) Prior Publication Data
US 2022/0021471 A1 Jan. 20, 2022

(30) Foreign Application Priority Data
Jul. 20, 2020 (JP) .............................. JP2020-123957

(51) Int. Cl.
*H04J 3/06* (2006.01)
*H04W 56/00* (2009.01)

(52) U.S. Cl.
CPC ....... *H04J 3/0602* (2013.01); *H04W 56/0015* (2013.01)

(58) Field of Classification Search
CPC .......................... H04J 3/0602; H04W 56/0015
See application file for complete search history.

(56) References Cited

U.S. PATENT DOCUMENTS

| | | | |
|---|---|---|---|
| 9,794,657 B1* | 10/2017 | Jiang | H04J 14/0212 |
| 10,034,241 B2 | 7/2018 | Sakata et al. | |
| 2010/0238845 A1* | 9/2010 | Love | H04B 7/15528 370/280 |
| 2011/0234380 A1* | 9/2011 | Ito | G06K 19/0724 340/10.2 |
| 2016/0100400 A1* | 4/2016 | Lu | H04W 4/80 370/336 |
| 2016/0150592 A1* | 5/2016 | Samuel | H04B 7/15528 370/315 |
| 2017/0290032 A1* | 10/2017 | Zhao | H04W 4/10 |

FOREIGN PATENT DOCUMENTS

| | | |
|---|---|---|
| JP | 6402456 B2 | 10/2018 |
| JP | 6471005 B2 | 2/2019 |
| JP | 6524304 B2 | 6/2019 |

OTHER PUBLICATIONS

Mills, D. et al., "Network time Protocol Version 4: protocol and Algorithms Specification," IETF RFC 5905, 110 pages (2010).

\* cited by examiner

*Primary Examiner* — Christine Ng
(74) *Attorney, Agent, or Firm* — Finnegan, Henderson, Farabow, Garrett & Dunner, LLP

(57) ABSTRACT

A communication device according to an embodiment includes one or more hardware processors. The one or more hardware processors: receives, from a server device performing communication by a communication method of synchronizing a number indicating a communication timing, a reference number indicating the number serving as a reference; and determines a processing timing of predetermined processing, based on the reference number.

12 Claims, 7 Drawing Sheets

| NODE IDENTIFIER | ACQUISITION TIME | SENSOR DATA |
|---|---|---|
| $100_1$ | 12:00:00 | VALUE SD1 |
| $100_1$ | 12:00:00 | VALUE SD2 |
| $100_2$ | 12:00:00 | VALUE SD3 |
| ⋮ | ⋮ | ⋮ |
| $100_{13}$ | 12:30:00 | VALUE SD4 |
| $100_1$ | 12:30:00 | VALUE SD5 |

US 11,509,409 B2

COMMUNICATION DEVICE, COMMUNICATION METHOD, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2020-123957, filed on Jul. 20, 2020; the entire contents of which are incorporated herein by reference.

FIELD

An embodiment described herein relates generally to a communication device, a communication method, a computer program product, and a communication system.

BACKGROUND

A communication system has been proposed. The communication system collects, from a plurality of communication devices (nodes) on a network, sensor data acquired by sensors connected to the respective communication devices. With such a communication system, a control for synchronizing acquisition timing (sensing timing) of the sensor data may be necessary in some cases.

For example, it is possible to control the acquisition timing by a technique that allows each of the communication devices to have a reception function of Global Positioning System (GPS) and a technique that distributes absolute time based on IETE RFC 5905 (Network Time Protocol: NTP).

However, the conventional techniques make a function for controlling the timing complicated. For example, with a technique using the GPS, the GPS is not necessarily usable at places where the sensors are set, and the power consumption increases. With a technique that distributes the absolute time, the control traffic increases, and it is necessary to provide an additional memory and control for managing the absolute time in the communication device.

DETAILED DESCRIPTION

A communication device according to an embodiment includes one or more hardware processors. The one or more hardware processors is configured to: receive, from a server device performing communication by a communication method of synchronizing a number indicating a communication timing, a reference number indicating the number serving as a reference; and determine a processing timing of predetermined processing, based on the reference number.

Hereinafter, preferred embodiments of a communication device, a communication method, a computer program product, and a communication system according to the present invention will be described in detail with reference to the accompanying drawings.

The communication system according to the embodiment does not manage the absolute time within the communication device but, instead, distributes a reference number serving as a reference for controlling the timing from a concentrator (an example of a device that collects sensor data of the communication device). The communication device determines the timing of processing (acquisition timing of sensor data and the like) based on the reference number.

Figure 1:
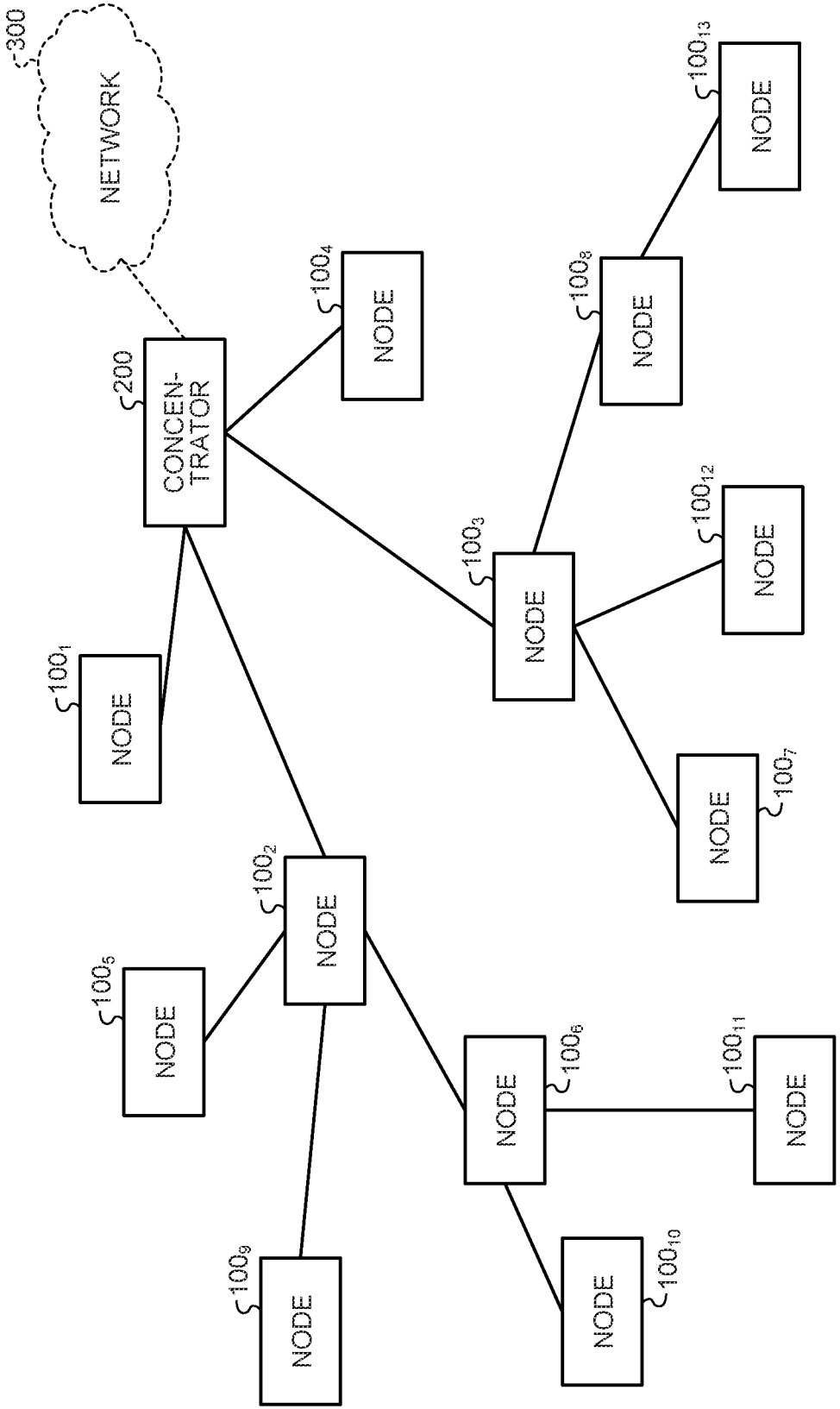
FIG. 1 is a block diagram illustrating a communication system of an embodiment.

FIG. 1 is a diagram illustrating a configuration example of the communication system according to the embodiment. As illustrated in FIG. 1, the communication system according to the embodiment includes a concentrator 200 (an example of a server device) and a plurality of nodes $100_1$ to $100_{13}$ (each being an example of the communication device).

The nodes $100_1$ to $100_{13}$ transmit the sensor data acquired by respective sensors connected thereto (or built-in sensors) to the concentrator 200. The nodes $100_1$ to $100_{13}$ may be formed in the same configuration, so that those may simply be referred to as the nodes 100 when not necessary to be distinguished from each other. The number of nodes 100 is not limited to thirteen, but may be any desired number.

The concentrator 200 is a device (concentrator device) that concentrates the sensor data transmitted from each of the nodes 100.

The concentrator 200 and the nodes $100_1$ to $100_{13}$ constitute a wireless multi-hop network. Communication within the wireless multi-hop network is controlled by time division multiplexing, for example. While any desired protocol may be employed as the wireless communication method, wireless communication methods such as IEEE 802.11, IEEE 802.15.4, or the like can be applied thereto.

The concentrator 200 may be connected to a network 300 in addition to the wireless multi-hop network. While the network 300 may have any desired network form, examples of network forms include a wide area network like the Internet, a closed network in a wide area, a local network such as a corporate network, for example.

The concentrator 200 and the network 300 may be connected via a wired connection using an Ethernet (registered trademark) cable, an optical fiber, or the like or may be connected via a wireless connection using a cellular network or a satellite link. Connection to the network 300 is not necessarily required, and the communication system may include only the wireless multi-hop network that is constituted of the concentrator 200 and the nodes $100_1$ to $100_{13}$.

The outline of timing control performed in the communication system according to the embodiment will be described.

The concentrator 200 transmits, on the wireless multi-hop network, the reference number (reference time information) corresponding to the reference time for calculating the timing (acquisition timing) for acquiring the sensor data. The reference number is a number serving as a reference among the numbers indicating the communication timings, which is synchronized by time division multiplexing. As the time division multiplexing. Time-Slotted Channel Hopping (TSCH) or the like may be applied, for example. Examples of the number indicating the communication timing may include a time slot number (ASN: Absolute Slot Number), a slot frame number, and a superframe number, for example. The reference number is determined as a number corresponding to the hour (every hour on the hour including 12:00 a.m.), for example.

In each of the nodes 100, at least an acquisition interval (an example of processing interval) of the sensor data is set in advance. The node 100 determines the next acquisition timing of the sensor data from three values that are the reference number transmitted from the concentrator 200, the current number managed by the node 100 itself, and the acquisition interval of the sensor data.

By having each of a plurality of the nodes 100 execute such operations, the nodes 100 can control the acquisition timing of the sensor data. That is, it becomes also possible to synchronize the acquisition timing of the sensor data among the sensors. Furthermore, it is not necessary for the node 100 to manage the absolute time, so that the timing can be controlled with a simpler configuration.

Until receiving the reference number, the node 100 repeats acquisition of the sensor data according to the acquisition interval of the sensor data with the time determined by another method (for example, time at which the node enters the network, or the like) as a starting point. In other words, the concentrator 200, by not transmitting the reference number therefrom, allows the nodes 100 within the network to execute operations to which the embodiment is not applied.

Figures 2, 3:
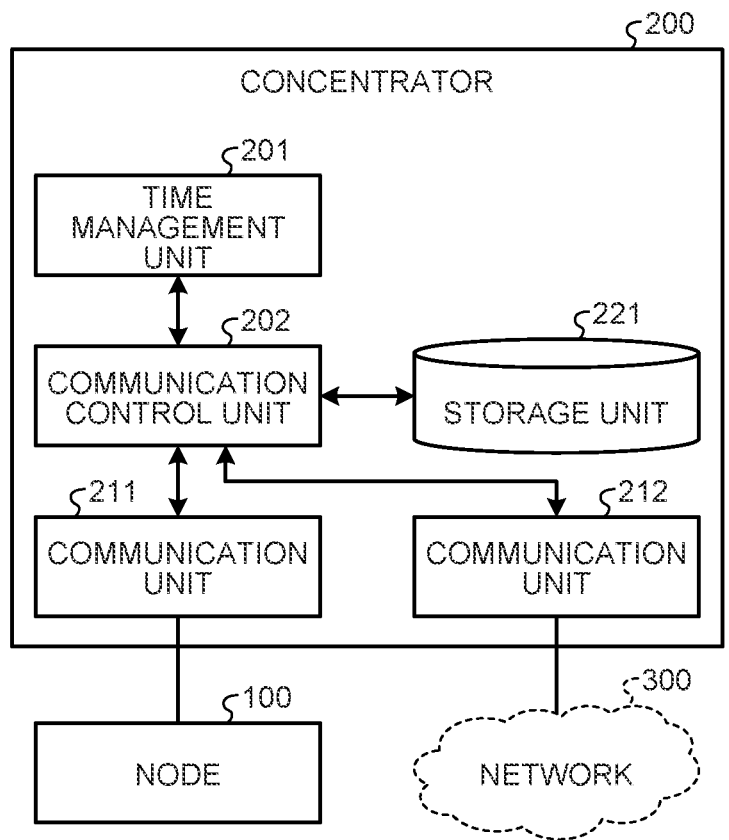
FIG. 2 is a functional block diagram of a concentrator.
FIG. 3 is a chart illustrating an example of a data structure of sensor data.

Next, a functional configuration example of the concentrator 200 will be described. FIG. 2 is a block diagram illustrating an example of the functional configuration of the concentrator 200. As illustrated in FIG. 2, the concentrator 200 includes a time management unit 201, a communication control unit 202, communication units 211, 212, and a storage unit 221.

The storage unit 221 stores therein various kinds of data used in the concentrator 200. For example, the storage unit 221 stores therein the sensor data transmitted from each of the nodes 100 and data to be transmitted to each of the nodes, such as control information, for example. In a case where the sensor data is saved and managed in an external storage device or the like of the concentrator 200, the storage unit 221 does not need to be provided.

The storage unit 221 may be configured with various storage media used in general, such as a flash memory, a memory card, a random access memory (RAM), a hard disc drive (HDD), and an optical disc.

The communication unit 211 performs communication with each of the nodes 100, and constitutes the wireless multi-hop network. In the wireless multi-hop network, communication control is performed by the time division multiplexing in the manner described above, so that the communication unit 211 operates by switching the processing for each time slot. That is, the communication unit 211 performs transmission processing in a time slot in which the communication unit 211 can transmit data, and the communication unit 211 performs reception processing in a time slot in which the communication unit 211 is to be waiting for receiving data. In a case where there is no data in a time slot in which the communication unit 211 can transmit data, or in a case of a time slot in which neither transmission nor reception can be performed, the communication unit 21 does not perform any operations. In a time slot in which neither transmission processing nor reception processing is performed, the communication unit 211 can transit to an ultralow power consumption mode, a power off mode, or the like, and stop operations. In a period during which the communication unit 211 does not perform any operations, the entire concentrator 200 may also operate in an ultralow power consumption mode.

The communication unit 212 is used for communication with the network 300. When the communication unit 212 is not connected to the network 300, the communication unit 212 does not need to be provided.

The time management unit 201 manages the current time in real time. The real time refers to the time used in daily life, with one day being 24 hours. While the time management unit 201 may acquire the current time by using any desired methods, it is possible to apply the following methods, for example.

Acquire current time information from a time server on the network 300

Acquire current time by using GPS

Acquire current time information from a base station of cellular phones

Input current time manually

It is assumed that the time management unit 201 acquires current time information in a proper frequency in accordance with precision of a crystal oscillator (clock) provided to the concentrator 200 and, during operations to be described hereinafter, the time management unit 201 can always hold the current time within a margin of an error that causes no practical problem.

For example, while the concentrator 200 immediately after being shipped from a factory and immediately after being powered on may not have an accurate current time, the time management unit 201 can recognize that the concentrator 200 is in such a state as having no current time. The concentrator 200, when having no current time information, does not perform operations described hereinafter. For example, upon acquiring the current time information, the concentrator 200 starts the operations described hereinafter. After acquiring the current time information once, the concentrator 200 may or may not continue to acquire the current time information at a predetermined timing (after specific time has passed, or the like). In a case of continuing to acquire the current time information at a predetermined timing, if acquisition fails, the concentrator 200 may operate as being in a state of "having no current time information" or the concentrator 200 may continue to operate as being in a state of "having time information".

The communication control unit 202 controls communication between the nodes 100 and the network 300. For example, the communication control unit 202 switches the operations of the communication unit 211 according to a schedule of the time division multiplexing. Furthermore, the communication control unit 202 performs construction and maintenance of the wireless multi-hop network, and reception and transfer processing of the sensor data transmitted via the wireless multi-hop network. When the concentrator 200 is connected to the network 300, the communication control unit 202 may or may not transfer the sensor data received via the communication unit 212 to the network 300. Furthermore, the communication control unit 202 may or may not store the sensor data in the storage unit 221. Furthermore, the communication control unit 202 may or may not transfer the sensor data saved in the storage unit 221 to the network 300. Moreover, the communication control unit 202 performs transmission processing of control information and the like to the nodes 100.

FIG. 3 is a chart illustrating an example of a data structure of the sensor data stored in the storage unit 221. The sensor data is stored by being associated with anode identifier and acquisition time. The node identifier is an example of identification information for identifying the node 100 as the sender of the sensor data. The acquisition time is the time at which the sensor data is acquired.

In addition to the value acquired (value read out) from the sensor, the sensor data is transmitted to the concentrator 200 along with the time slot number for which the value is acquired. The concentrator 200 uses the time management unit 201 and the communication control unit 202 to calculate the corresponding real time from the time slot number included in the sensor data. With such processing, the sensor data can be managed along with the acquisition time. The concentrator 200 may treat the time slot number directly as the acquisition time without converting the acquisition time to the real time. Furthermore, while the time at which the concentrator 200 received each sensor data can also be managed with the same method, the associated reception time may or may not be recorded in the storage unit 221.

Each of the above-described units (the time management unit 201, the communication control unit 202) can be implemented by one or more hardware processors, for example. For example, each of the above-described units may be implemented by executing a computer program product with a processor such as a central processing unit (CPU), that is, may be implemented by software. Each of the above-described units may be implemented by a processor such as a dedicated integrated circuit (IC), that is, may be implemented by hardware. Each of the above-described units may be implemented by using software and hardware in combination. In a case of using a plurality of processors, each of the processors may implement one of the units or two or more of the units.

Figure 4:
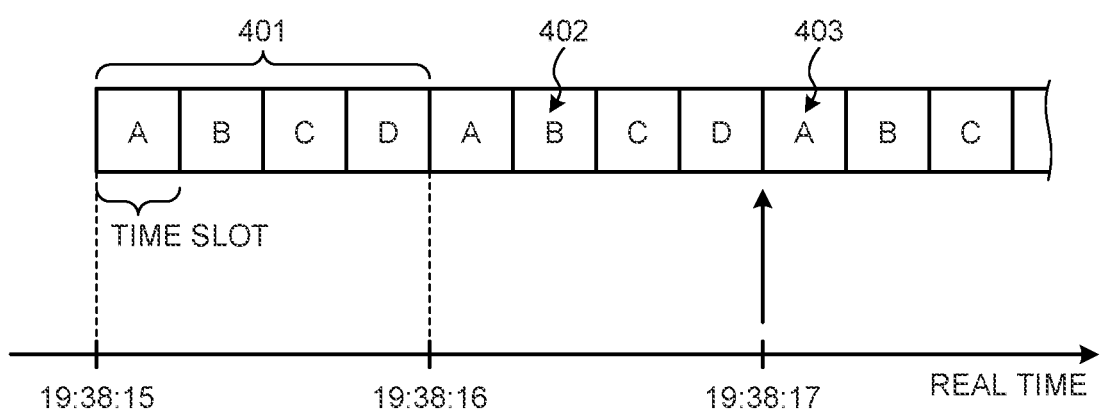
FIG. 4 is a chart illustrating a relation between real time and time slots of time division multiplexing.

An example of the communication control of the time division multiplexing executed by the communication control unit 202 will be described herein. FIG. 4 is a chart illustrating a relation between real time and time slots of the time division multiplexing. As illustrated in FIG. 4, it is assumed that the concentrator 200 starts the wireless multi-hop network at 19:38:15. The length of a single time slot is 250 milliseconds, and four time slots are defined as a schedule unit 401 of the time division multiplexing. That is, if the schedule does not change after 19:38:15, the same communication schedule is repeated every second. Note that A, B, C, and D denote four schedules executed every second.

A time slot number is given to each of the time slots. In an example of FIG. 4, assuming that the time slot number of the time slot immediately after the concentrator 200 starts the wireless multi-hop network is an integer n, a time slot number n+5 is given to the time slot 402 that is the sixth time slot. For example, assuming that the time slot number n of the first time slot (the time slot corresponding to A at the left end in FIG. 4) is 0, the time slot number of the time slot 402 is 5. Basically, the time slot number monotonically increases. When there is an upper limit value in the time slot number, the time slot number returns to 0 after reaching the upper limit value, and starts monotonically increasing again.

Such communication schedule and time slot numbers of the time division multiplexing are managed by the communication control unit 202 of the concentrator 200. The communication control unit 202 can acquire the correspondence between the real time and the time slot number by acquiring the current time from the time management unit 201. In the example of FIG. 4, the communication control unit 202 can determine that the time slot 403 having the time slot number n+8 starts at 19:38:17.

The communication control unit 202 transmits the time slot number corresponding to the current time to the wireless multi-hop network via the communication unit 211 regularly or upon receiving an instruction or the like from the network 300. The types of frames (packets) for the transmission are not specifically limited. Beacon frames may be used or data frames may be used. Those frames may be broadcasted or unicasted to each of the nodes 100 neighboring to the concentrator 200. In any case, by transmitting the time slot number from the concentrator 200, the nodes 100 neighboring to the concentrator 200 acquire the time slot number corresponding to a certain time. The transmitted time slot number is called a reference time slot number. The reference time slot number is an example of the reference number.

Figure 5:
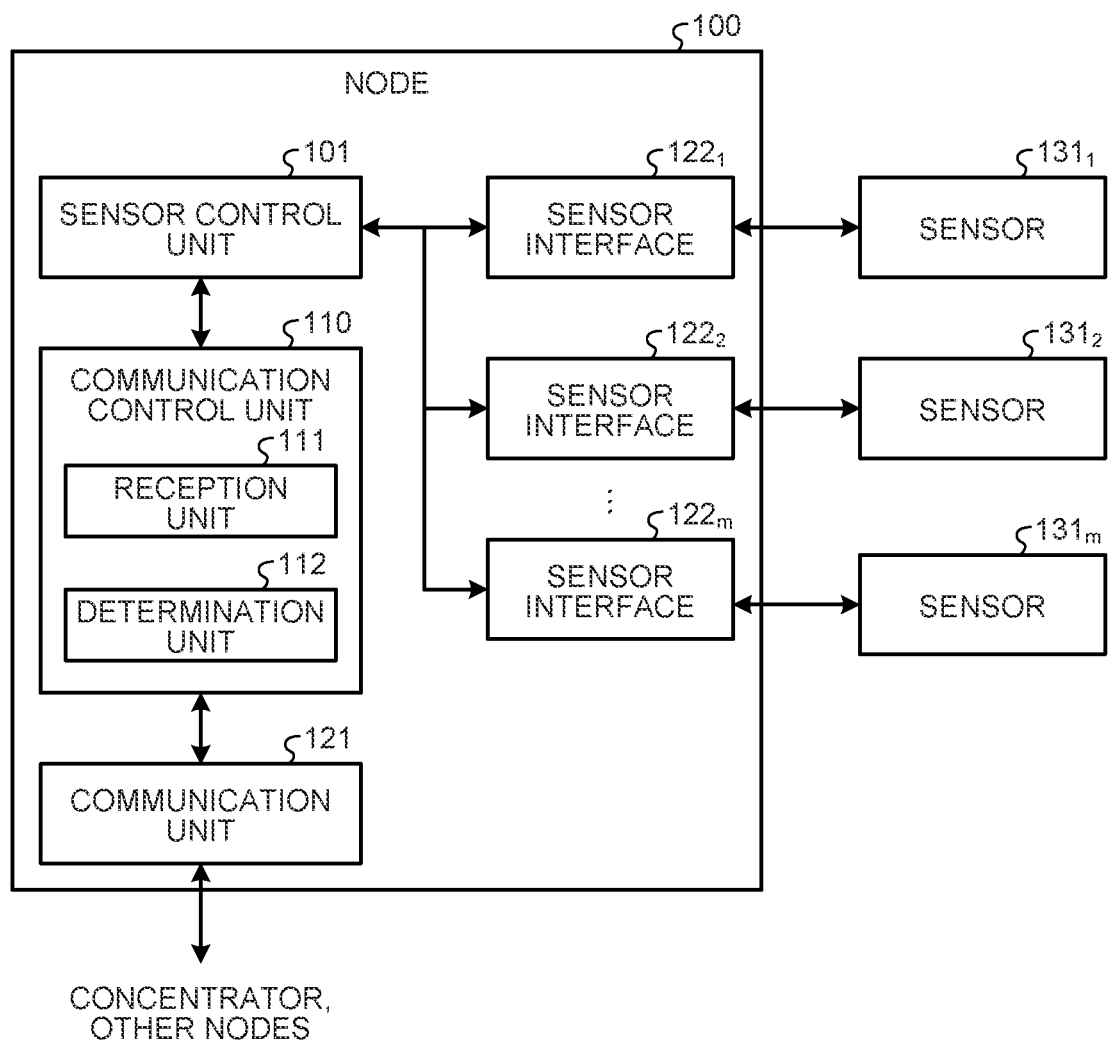
FIG. 5 is a functional block diagram of a node.

Next, the configuration of the node 100 will be described. FIG. 5 is a block diagram illustrating an example of the functional configuration of the node 100. As illustrated in FIG. 5, the node 100 includes a sensor control unit 101, a communication control unit 110, a communication unit 121, and one or more sensor interfaces $122_1$ to $122_m$ (m is an integer of one or a larger value).

Each of the sensor interfaces $122_1$ to $122_m$ is connected to respective sensors $131_1$ to $131_m$. The sensor interfaces $122_1$ to $122_m$ are simply referred to as the sensor interfaces 122 when not necessary to be distinguished from each other. Furthermore, the sensors $131_1$ to $131_m$ are simply referred to as the sensors 131 when not necessary to be distinguished from each other.

The communication unit 121 performs the same operations as those of the communication unit 211 of the concentrator 200.

The communication control unit 110 switches the operations of the communication unit 121 according to the communication schedule of the time division multiplexing like the communication control unit 202 of the concentrator 200. Furthermore, the communication control unit 110 finds and connects to the wireless multi-hop network started by the concentrator 200, and performs setting, alteration, and the like of the communication path and communication schedule. For such operations, the communication control unit 110 transmits and receives control frames and the like including beacons with the other nodes 100 via the communication unit 121.

The communication control unit 110 includes a reception unit 111 and a determination unit 112. The reception unit 111 receives data from the concentrator 200 and the like. For example, the reception unit 111 receives the reference number from the concentrator 200.

The determination unit 112 determines a processing timing of predetermined processing, based on the reference number. While the predetermined processing and the processing timing are processing of acquiring the sensor data and an acquisition timing thereof, respectively, it is not intended to be limited thereto. The determination unit 112 is not necessarily provided inside the communication control unit 110, but may be provided outside the communication control unit 110. For example, the determination unit 112 may be provided inside the sensor control unit 101. Details of the functions of the reception unit 111 and the determination unit 112 will be described later.

The sensor control unit 101 acquires the sensor data via the sensor interfaces 122. The acquired sensor data is transmitted to the wireless multi-hop network via the communication control unit 110. Typically, the communication control unit 110 transmits the sensor data to the concentrator 200 as the destination. In the sensor control unit 101, the acquisition interval of the sensor data is set in advance for each of the sensor interfaces 122. Furthermore, in a case where there is a request for acquiring the sensor data from the wireless multi-hop network, or the like, the sensor control unit 101 acquires the sensor data regardless of the acquisition time set in advance and transmits the sensor data to the requester via the communication control unit 110.

The sensor interface 122 inquires the sensor data to the connected sensor 131 to acquire the sensor data in response to the request from the sensor control unit 101. In a case where the sensor 131 is a rain gauge that generates a pulse for a specific observed value, the sensor data cannot be acquired by inquiring to the sensor 131. When such a sensor 131 is connected to the sensor interface 122, the sensor interface 122 manages an integrated value based on the pulse and the like received from the sensor 131. At this time, the storage unit (memory) for managing the integrated value may be provided outside the sensor interface 122. A memory area for managing the integrated value may be included in the sensor interface 122. When the so-called preliminary energization or preheat is required for acquiring the sensor data, preliminary energization is started in advance by counting backwards from the time slot to acquire the sensor data.

Each of the above-described units (the sensor control unit 101, the communication control unit 110) can be implemented by one or more hardware processors, for example. For example, each of the above-described units may be implemented by executing a computer program product with a processor such as a central processing unit (CPU), that is, may be implemented by software. Each of the above-described units may be implemented by a processor such as a dedicated integrated circuit (IC), that is, may be implemented by hardware. Each of the above-described units may be implemented by using software and hardware in combination. In a case of using a plurality of processors, each of the processors may implement one of the units or two or more of the units.

Figure 6:
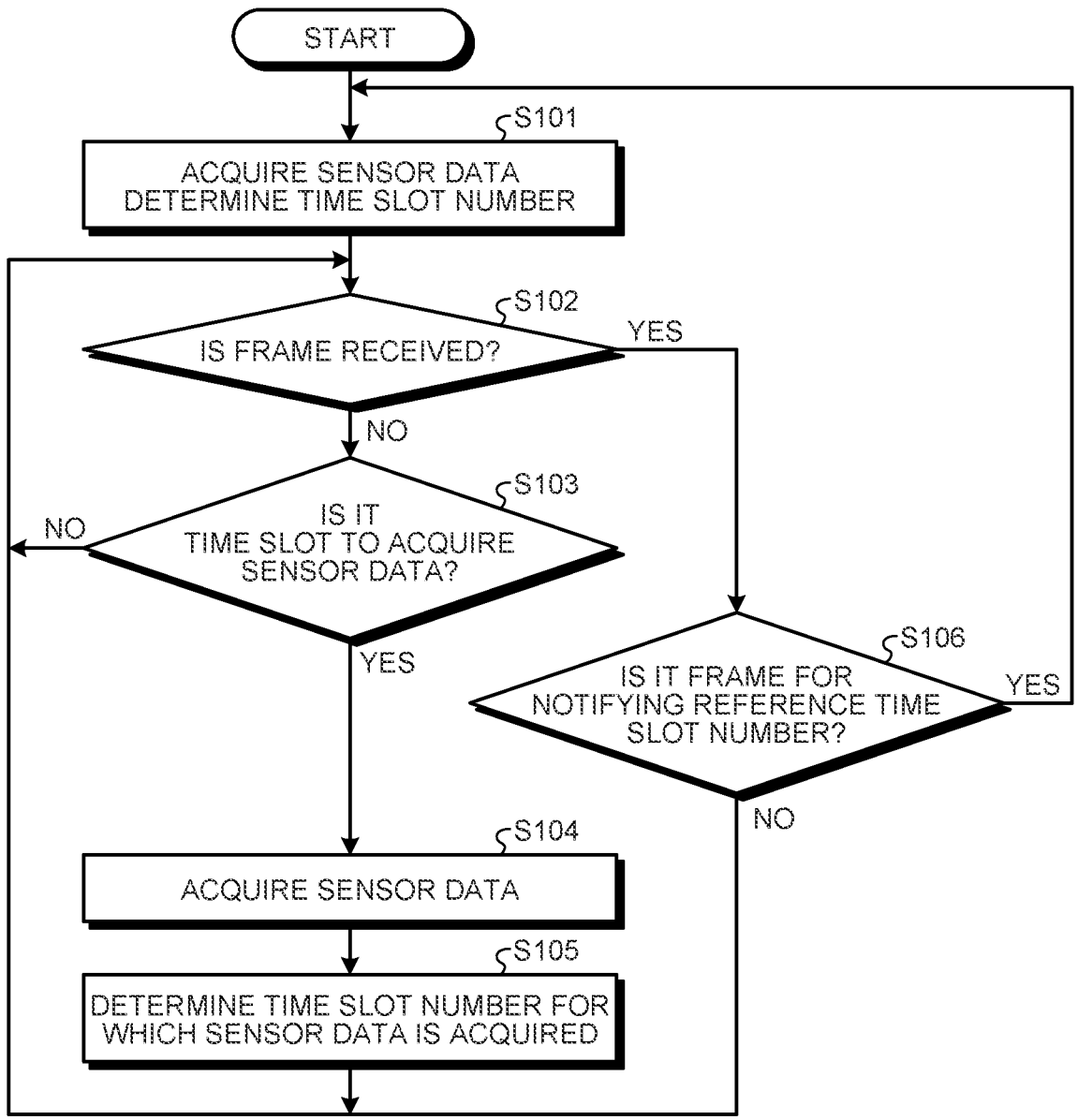
FIG. 6 is a flowchart of data acquisition processing according to the embodiment.

Next, data acquisition processing executed by the node 100 according to the embodiment configured in the above-described manner will be described. FIG. 6 is a flowchart illustrating an example of the data acquisition processing according to the embodiment.

The node 100 starts the data acquisition processing illustrated in FIG. 6 when connected to the wireless multi-hop network, for example.

First, the determination unit 112 determines a time slot number for which the sensor data is to be acquired next (step S101). For example, the determination unit 112 determines the time slot number for which the sensor data is to be acquired next based on the acquisition interval of the sensor data.

Thereafter, the reception unit 111 enters a state of waiting for receiving the data, and determines whether to have received a frame (step S102). When the node 100 is connected to the wireless multi-hop network, the time slot expectedly to receive a frame is determined. Thus, even in a state of waiting for receiving the data, reception waiting does not need to be continuously performed for time slots other than those expectedly to receive a frame. When a frame is not received (No at step S102), the sensor control unit 101 determines whether the current time slot number is a time slot number for which the sensor data is to be acquired (step S103). When the current time slot number is not the time slot number for which the sensor data is to be acquired (No at step S103), the processing is returned to step S102 and repeated therefrom. Note that when the current time slot number is the next reference time slot number estimated by the sensor node 100 itself, the estimated next reference time slot number may be taken as the current reference time slot number, and may estimate a following next reference slot number.

When the current time slot number is the time slot number for which the sensor data is to be acquired (Yes at step S103), the sensor control unit 101 acquires the sensor data from the sensor 131 (step S104). Note that waiting for receiving the data (step S102) and determining acquisition of the sensor data (step S103) may be in an inverted order. In a case where the so-called preliminary energization or preheat is required for acquiring the sensor data, when it is determined as a result of counting backwards from the time slot to acquire the sensor data next that it is necessary to start preheat from the current time slot, preheat is started.

After acquiring the sensor data, the determination unit 112 adds the acquisition interval of the sensor data to the current time slot number for which the current sensor data is acquired so as to determine the time slot number for which the sensor data is to be acquired next (step S105). In a case where the next reference time slot number is estimated by the sensor node 100 itself and the next time slot number for which the sensor data is to be acquired is a future number with respect to the next reference time slot number, the determination unit 112 may determine the next time slot number, for which the sensor data is to be acquired, as the next reference time slot number.

When a frame is received at step S102 (Yes at step S102), the determination unit 112 determines whether the received frame is the frame giving notification of the reference time slot number (step S106). When it is the frame giving notification of the reference time slot number (Yes at step S106), the determination unit 112 returns to step S101 and determines the time slot number for which the sensor data is to be acquired next based on the acquisition interval of the sensor data and the notified reference time slot number. Note that the sensor node 100 itself may estimate, before receiving the next reference time slot number, the next reference slot number by using the information on the interval (for example, 1 hour in a case of every hour on the hour) between the reference time slot and the next reference time slot and using the current reference time slot number. While the information on the interval at which the reference time slot is updated may be recorded in advance in the sensor node 100, for example, it is not limited only to such a method.

When it is not the frame giving notification of the reference time slot number (No at step S106), the processing is returned to step S102 and repeated therefrom.

An example of setting the acquisition timing of the sensor data will be described. For example, the concentrator 200 transmits the reference time slot number corresponding to every hour on the hour. In the node 100, an acquisition interval of 20 minutes is set, for example. In that case, the node 100 determines the acquisition timing to acquire the sensor data at 0 minute, 20 minutes, and 40 minutes past every hour.

Next, details of the determination method of the time slot number at step S101 will be described. The determination unit 112 determines the time slot number for which the sensor data is to be acquired as follows.

When the node 100 has no reference time slot number or when the reference time slot number is the same as the current time slot number, the determination unit 112 determines the current time slot number as the time slot number for which the sensor data is to be acquired next. In a case where the node 100 has no reference time slot number, when the so-called preliminary energization or preheat is necessary for acquiring the sensor data, a time slot number acquired by adding the number of time slots corresponding to the time required for the preliminary energization to the current time slot number is determined as the time slot number for which the senor data is to be acquired next.

The determination unit 112 determines the time slot number for which the senor data is to be acquired next, based on a value acquired by adding an integral multiple of the acquisition interval to the reference time slot number. Here, the value corresponds to a future time closest to the current time.

For example, when the reference time slot number is a future time slot number, the determination unit 112 determines, as the time slot number for which the sensor data is to be acquired next, the future time slot number closest to the current time slot number among the time slot numbers matching the reference time slot number as a result of adding an integral multiple of the acquisition interval of the sensor data.

When the reference time slot number is a past time slot number, the determination unit 112 determines, as the time slot number for which the sensor data is to be acquired next, the future time slot number closest to the current time slot number among the time slot numbers acquired as a result of adding an integral multiple of the acquisition interval of the sensor data.

In a case where the processing of step S101 is executed after receiving the reference time slot number (Yes at step S106), when the already held reference time slot number and a reference time slot received anew are the same, the determination unit 112 may or may not recalculate the time slot number for which the sensor data is to be acquired next.

After receiving the reference time slot number transmitted from the concentrator 200, the node 100 retransmits the received reference time slot number to the other connected nodes 100 in the same method as that of the concentrator 200. Thereby, the reference time slot number transmitted from the concentrator 200 is transmitted throughout the entire wireless multi-hop network.

With the processing described above, the acquisition timing of the sensor data for each of the nodes 100 can be controlled according to the reference time slot number transmitted from the concentrator 200 without having each of the nodes 100 manage the absolute time.

Modification Example 1

The communication system may include a relay node (relay device). The relay node is a node having a function of relaying (transferring) the sensor data transmitted from another node 100. For example, among each of the structural units of the node 100 illustrated in FIG. 5, the relay node does not need to include a part of or a whole part of the functions (the sensor interface 122, the sensor control unit 101, and the determination unit 112) for acquiring the sensor data.

The node 100 in the configuration as illustrated in FIG. 5 may operate as the relay node. For example, the node 100 may operate as the relay node when detecting that the sensor 131 is not connected at startup. Furthermore, the node 100 may operate as the relay node when being set in advance to such an operation mode as to operate as the relay node.

Modification Example 2

The determination unit 112 may determine the next acquisition timing of the sensor data by considering, in addition to the acquisition interval of the sensor data, an offset from the reference time slot number. For example, an offset from the reference time slot number is set for each of the sensor interfaces 122. The offset may be a numerical value that can be directly added to the reference time slot number or may be expressed in a form (for example, time) that can be converted to a numerical value.

The determination unit 112 calculates a new reference time slot number (update number) by adding the set offset to the reference time slot number for each of the sensor interfaces 122. The determination unit 112 determines the time slot number for which the sensor data is to be acquired next in the same manner as that of the embodiment described above by using the new reference time slot number. When the time slot number is not notified, the determination unit 112 disregards the offset and determines the time slot number for which the sensor data is to be acquired next.

A setting example of the acquisition timing of the sensor data according to the modification example will be described. For example, the concentrator 200 transmits the reference time slot number every hour on the hour. In the node 100, an acquisition interval of 20 minutes and an offset of 10 minutes are set, for example. In that case, the node 100 determines the acquisition timing to acquire the sensor data at 10, 30, and 50 minutes past every hour.

Modification Example 3

The concentrator 200 may transmit the reference time slot number determined for each of the nodes 100 to the wireless multi-hop network. For example, the concentrator 200 determines a future time slot number for which the sensor data is supposed to be acquired for each of the nodes 100, and transmits the future time slot number to the corresponding node 100 as the destination. Each of the nodes 100 determines the time slot number for which the sensor data is to be acquired in the same manner as that of the embodiment based on the reference time slot number transmitted to the node itself. Each of the nodes 100 transmits the acquired sensor data to the wireless multi-hop network.

By changing the acquisition interval of the sensor data for each of the nodes 100, acquisition timings of a plurality of pieces of sensor data can be flexibly aligned.

Modification Example 4

The concentrator 200 may transmit the reference time slot number determined for each of the nodes 100 and for each types of the sensors 131 (each sensor type) to the wireless multi-hop network. For example, the concentrator 200 determines a future time slot number for which the sensor data is to be acquired for each of the nodes 100 and each of the sensor types, and transmits the future time slot number to the corresponding node 100 as the destination. To the reference time slot number, identification information for identifying the sensor type to be applied is added. Based on the reference time slot number transmitted to itself, each of the nodes 100 determines the time slot number for which the sensor data is to be acquired for the sensor 131 corresponding to the sensor type identified by the identification information. Each of the nodes 100 transmits the sensor data acquired from the corresponding sensor 131 to the wireless multi-hop network.

By changing the acquisition interval of the sensor data for each of the nodes 100 and each of the sensor types, acquisition timings of a plurality of pieces of sensor data can be flexibly aligned.

Modification Example 5

The examples using the time slot number as the number indicating mainly the communication timing has been described heretofore. It is also possible to have a configuration in which a reference slot frame number is transmitted as the reference number and the slot frame number is used as the number indicating the communication timing. The concentrator 200 may transmit an offset of the time slot in a slot frame in addition to the slot frame number for giving notification of the reference time with higher precision. The offset of the time slot is an offset for the first time slot in the slot frame, for example.

Figure 7:
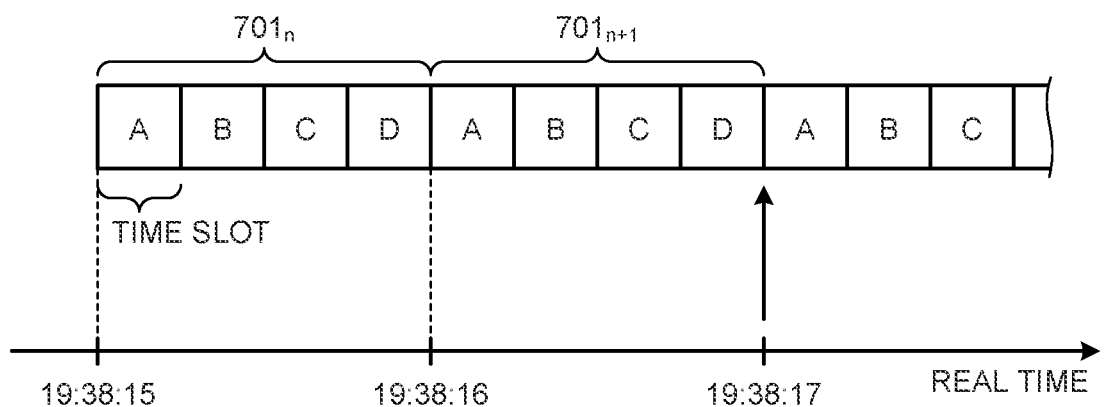
FIG. 7 is a chart illustrating a relation between real time and slot frames of the time division multiplexing.

FIG. 7 is a chart illustrating a relation between real time and slot frames of the time division multiplexing. The slot frame is a unit of a schedule including a specific number of time slots. FIG. 7 illustrates an example in which each of slot frames $701_n$ and $701_{n+1}$ includes four time slots. Like the time slot, a slot frame number is given to the slot frame.

Modification Example 6

Figure 8:
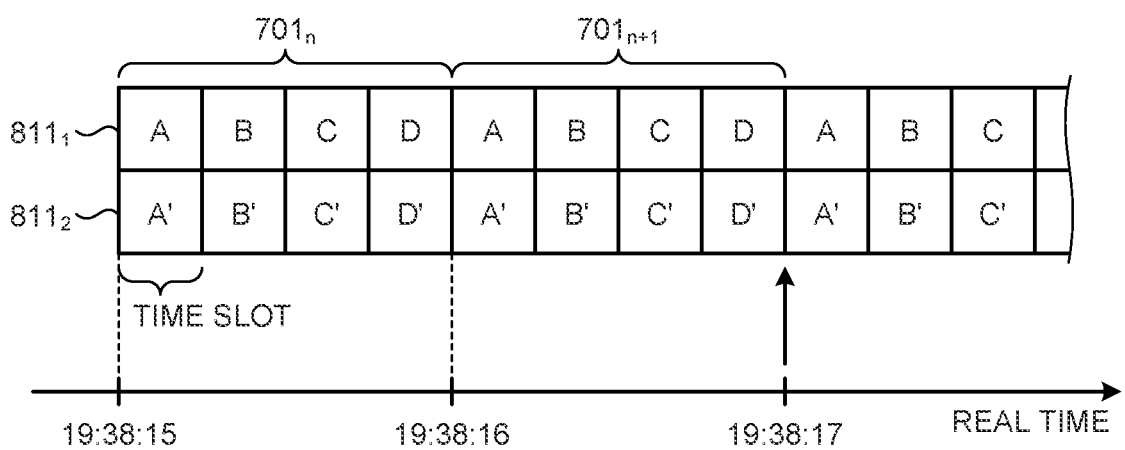
FIG. 8 is a chart illustrating a relation between real time and slot frames of the time division multiplexing.

Depending on the method of time division multiplexing, there may be a case where one or more channels (frequencies) are used. For example, with TSCH, the channel to be used is changed every time the data is transmitted and received. The method of the embodiment described above can be applied to such time division multiplexing as well. FIG. 8 is a chart illustrating a relation between real time and slot frames of the time division multiplexing in a case of using two channels $811_1$ and $811_2$.

In a communication schedule of such time division multiplexing, a channel used for communication is designated in addition to the time slot number. The channel may be designated by channel offset. The concentrator 200 and the nodes 100 transmit and receive the reference numbers and the sensor data by using the designated channel.

Modification Example 7

It is also possible to have a configuration in which a reference superframe number is transmitted as the reference number and a superframe number is used as the number indicating the communication timing.

Figure 9:
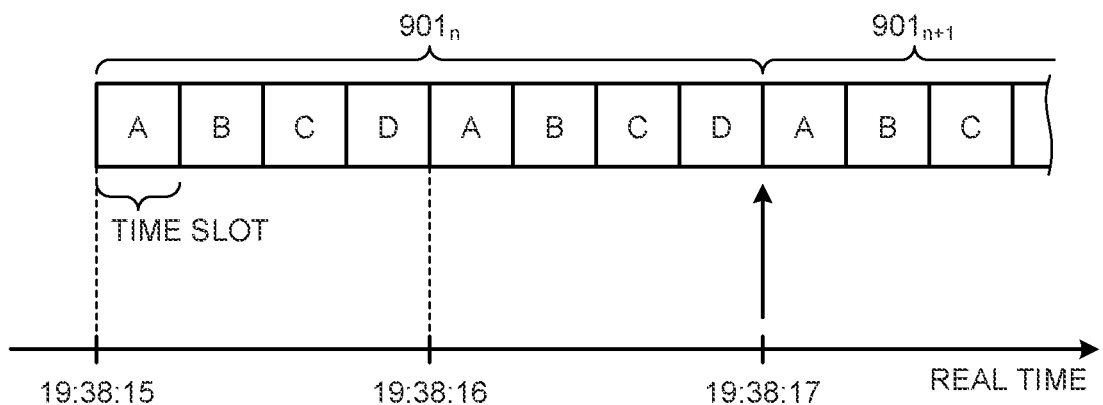
FIG. 9 is a chart illustrating a relation between real time and superframes of the time division multiplexing.

FIG. 9 is a chart illustrating a relation between real time and superframes of the time division multiplexing. A superframe is a unit of a schedule including a specific number of slot frames. FIG. 9 illustrates an example that superframes $901_n$ and $901_{n+1}$ each includes two slot frames. A superframe number is given to the superframe.

A period of the superframe is longer than that of the time slot. The concentrator 200 may transmit an offset of the time slot in the superframe in addition to the superframe number for giving notification of the reference time with still higher precision. The offset of the time slot is an offset for the first time slot in the superframe, for example.

There may be a case where setting is made such that a fixed time slot (for example, the first time slot) in the superframe is acquired on the node 100 side. In that case, the determination unit 112 determines, as the time slot corresponding to a new reference number, the time slot corresponding to the fixed time slot closest in the past or the fixed time slot closest in the future from the time slot identified by the reference superframe number and the offset of the time slot. Then, the determination unit 112 uses the new reference number to determine the time slot number for which the sensor data is to be acquired next in the same manner as that of the embodiment described above.

Modification Example 8

The examples of controlling the timing of mainly the processing of acquiring the sensor data have been described heretofore. As described above, the processing defined in advance may be other than the processing of acquiring the sensor data. For example, when controlling the timing of following processing, it is also possible to apply the method of the above-described embodiment.

On/off control of light bulb

Moving control of actuator and the like

As described above, with the communication system according to the embodiment, it is unnecessary to manage the absolute time and possible to control the timing with a simpler configuration.

Figure 10:
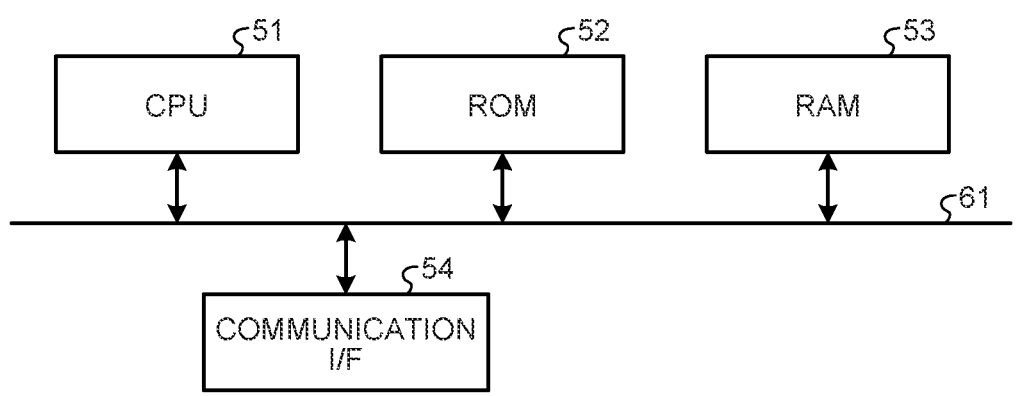
FIG. 10 is a block diagram of hardware of a device according to the embodiment.

Next, a hardware configuration of the devices (the concentrator, the node) according to the embodiment will be described by referring to FIG. 10. FIG. 10 is an explanatory diagram illustrating an example of the hardware configuration of the devices according to the embodiment.

The device according to the embodiment includes a control device such as a CPU 51, storage devices such as a read only memory (ROM) 52 and a random access memory (RAM) 53, a communication I/F 54 for performing communication by connecting to a network, and a bus 61 that connects each of the units.

A computer program product executed by the device according to the embodiment is provided by being loaded in advance on the ROM 52 or the like.

The computer program product executed by the device according to the embodiment may be configured to be provided as a computer program product in a file of an installable form or an executable form by being recorded on a non-transitory computer-readable recording medium, such as a compact disc read only memory (CD-ROM), a flexible disc (FD), a compact disc recordable (CD-R), or a digital versatile disc (DVD).

Furthermore, the computer program product executed by the device according to the embodiment may be provided by being stored on a computer that is connected to a network such as the Internet and downloaded via the network. Furthermore, the computer program product executed by the device according to the embodiment may be provided or distributed via a network such as the Internet.

The computer program executed by the device according to the embodiment may cause a computer to function as each of the units of the device described above. The computer enables the CPU 51 to load the computer program product on a main memory from the computer readable storage medium, so as to execute the computer program product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   one or more hardware processors configured to:

receive, from a server device performing communication by a communication method of synchronizing a number indicating a communication timing, a reference number indicating the number serving as a reference; and determine a processing timing of predetermined processing, based on a value acquired by adding an integral multiple of a predetermined processing interval to the reference number or to an update number, the update number being acquired by adding a predetermined offset to the reference number, the value corresponding to a future time closest to a current time.

2. The device according to claim 1, wherein the communication method is time division multiplexing.

3. The device according to claim 2, wherein
the time division multiplexing manages the number by a time slot number, a slot frame number, or a superframe number, and
the reference number is a reference time slot number indicating the time slot number serving as a reference, a reference slot frame number indicating the slot frame number serving as a reference, or a reference superframe number indicating the superframe number serving as a reference.

4. The device according to claim 2, wherein
the time division multiplexing manages the number by a superframe number,
the reference number is a reference superframe number indicating the superframe number serving as a reference, and
the one or more hardware processors are configured to:
receive the reference superframe number and the offset of a time slot in a superframe;
calculate the update number by adding the offset to the reference superframe number; and
determine one or more of the processing timings that are acquired by adding, to the update number, one or more values each of which is an integral multiple of a predetermined processing interval.

5. The device according to claim 2, wherein
the time division multiplexing manages the number by a superframe number,
the reference number is a reference superframe number indicating the superframe number serving as a reference, and
the one or more hardware processors are configured to:
receive the reference superframe number and the offset of a time slot in a superframe;
calculate the update number by adding the offset to the reference superframe number; and
determine, as the processing timing, a time slot closest to the update number among time slots in a superframe, the time slots being defined as time slots for executing the predetermined processing.

6. The device according to claim 1, wherein the one or more hardware processors are configured to estimate, based on the received reference number, a next reference number before receiving the next reference number.

7. The device according to claim 6, wherein the one or more hardware processors are configured, when the determined processing timing corresponds to a future time with respect to the estimated reference number, to determine the estimated reference number as the processing timing.

8. A communication method implemented by a computer, the method comprising:
receiving, from a server device performing communication by a communication method of synchronizing a number indicating a communication timing, a reference number indicating the number serving as a reference; and
determining a processing timing of predetermined processing, based on a value acquired by adding an integral multiple of a predetermined processing interval to the reference number or to an update number, the update number being acquired by adding a predetermined offset to the reference number, the value corresponding to a future time closest to a current time.

9. A computer program product comprising a non-transitory computer-readable recording medium on which an executable program is recorded, the program instructing a computer to:
receive, from a server device performing communication by a communication method of synchronizing a number indicating a communication timing, a reference number indicating the number serving as a reference; and
determine a processing timing of predetermined processing, based on a value acquired by adding an integral multiple of a predetermined processing interval to the reference number or to an update number, the update number being acquired by adding a predetermined offset to the reference number, the value corresponding to a future time closest to a current time.

10. A communication system comprising:
a server device; and
one or more communication devices, wherein
the server device communicates with the one or more communication devices by a communication method of synchronizing a number indicating a communication timing,
each of the one or more communication devices includes one or more hardware processors configured to:
receive, from the server device, a reference number indicating the number serving as a reference; and
determine a processing timing of predetermined processing, based on a value acquired by adding an integral multiple of a predetermined processing interval to the reference number or to an update number, the update number being acquired by adding a predetermined offset to the reference number, the value corresponding to a future time closest to a current time.

11. The system according to claim 10, wherein the server device transmits the reference number determined for each of the one or more communication devices.

12. The system according to claim 10, further comprising a relay device that transfers the reference number transmitted from the server device to at least one of the one or more communication devices.

* * * * *